(12) United States Patent
Cao et al.

(10) Patent No.: US 10,948,760 B2
(45) Date of Patent: Mar. 16, 2021

(54) LIQUID CRYSTAL DISPLAY PANEL

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Zijun Cao, Beijing (CN); Ruifang Du, Beijing (CN)

(73) Assignees: HEFEI XINSHENG OPTOELECTRONICS TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/497,134

(22) PCT Filed: Nov. 14, 2018

(86) PCT No.: PCT/CN2018/115412
§ 371 (c)(1),
(2) Date: Sep. 24, 2019

(87) PCT Pub. No.: WO2019/148935
PCT Pub. Date: Aug. 8, 2019

(65) Prior Publication Data
US 2020/0285102 A1    Sep. 10, 2020

(30) Foreign Application Priority Data

Jan. 31, 2018    (CN) .......................... 201810096565.2

(51) Int. Cl.
| | |
|---|---|
| *G02F 1/1335* | (2006.01) |
| *G02F 1/13357* | (2006.01) |
| *G02F 1/1333* | (2006.01) |

(52) U.S. Cl.
CPC .. *G02F 1/133514* (2013.01); *G02F 1/133617* (2013.01); *G02F 1/133388* (2021.01);
(Continued)

(58) Field of Classification Search
CPC .................................................. G02F 1/133514
See application file for complete search history.

(56) References Cited

U.S. PATENT DOCUMENTS

| | | | |
|---|---|---|---|
| 2013/0188253 A1* | 7/2013 | Nakai | ....................... G02B 5/28 |
| | | | 359/584 |
| 2015/0275081 A1* | 10/2015 | Sohn | ................... C09K 11/7734 |
| | | | 252/301.4 F |

(Continued)

FOREIGN PATENT DOCUMENTS

| | | |
|---|---|---|
| CN | 106054442 A | 10/2016 |
| CN | 106324936 A | 1/2017 |

(Continued)

OTHER PUBLICATIONS

International Search Report and Written Opinion issued in corresponding International Application No. PCT/CN2018/115412, dated Feb. 20, 2019, with English translation.

(Continued)

*Primary Examiner* — Sang V Nguyen
(74) *Attorney, Agent, or Firm* — McDermott Will and Emery LLP (57) ABSTRACT

A liquid crystal display panel includes a light adjusting layer. The light adjusting layer is configured to reduce a yellowing degree of a peripheral display area. The light adjusting layer is located in the peripheral display area in a display area of the liquid crystal display panel, and the peripheral display area is located at a periphery of an intermediate display area in the display area.

15 Claims, 5 Drawing Sheets

(52) U.S. Cl.
CPC .... *G02F 1/133521* (2021.01); *G02F 2201/08* (2013.01); *G02F 2202/04* (2013.01)

(56) References Cited

U.S. PATENT DOCUMENTS

| | | | |
|---|---|---|---|
| 2017/0131601 A1* | 5/2017 | Jiang | ................. G02F 1/133514 |
| 2017/0351140 A1 | 12/2017 | Kira et al. | |
| 2018/0057739 A1* | 3/2018 | Wakui | ................... C09K 11/025 |
| 2019/0004345 A1* | 1/2019 | Jiang | ................. G02F 1/133512 |

FOREIGN PATENT DOCUMENTS

| | | | | |
|---|---|---|---|---|
| CN | 106873205 | * | 6/2017 | ............. G02F 1/133 |
| CN | 106873205 A | | 6/2017 | |
| CN | 107477436 | * | 12/2017 | ................ F21S 8/00 |
| CN | 107477436 A | | 12/2017 | |
| CN | 108227289 A | | 6/2018 | |

OTHER PUBLICATIONS

First Office Action issued in corresponding Chinese Application No. 201810096565.2, dated Apr. 12, 2019, with English translation.
Second Office Action issued in corresponding Chinese Application No. 201810096565.2, dated Oct. 30, 2019, with English translation.

* cited by examiner

LIQUID CRYSTAL DISPLAY PANEL

CROSS-REFERENCE TO RELATED APPLICATION

This application is a national phase entry under 35 USC 371 of International Patent Application No. PCT/CN2018/115412 filed on Nov. 14, 2018, which claims priority to Chinese Patent Application No. 201810096565.2, filed with the Chinese Patent Office on Wednesday, Jan. 31, 2018, titled "LIQUID CRYSTAL DISPLAY PANEL, PREPARATION METHOD THEREFOR, AND LIQUID CRYSTAL DISPLAY DEVICE", which are incorporated herein by reference in their entirety.

TECHNICAL FIELD

The present disclosure relates to the field of liquid crystal display technologies, and in particular, to a liquid crystal display panel.

BACKGROUND

At present, a liquid crystal display (abbreviated as LCD) device is more and more widely used due to its low power consumption, miniaturization, lightness and thinness and other advantages.

SUMMARY

A liquid crystal display panel is provided. The liquid crystal display panel includes a light adjusting layer. The light adjusting layer is configured to reduce a yellowing degree of a peripheral display area. The light adjusting layer is located in the peripheral display area in a display area of the liquid crystal display panel, and the peripheral display area is located at a periphery of an intermediate display area in the display area.

In some embodiments, the light adjusting layer is configured to absorb yellow light.

In some embodiments, the light adjusting layer is configured to emit blue light.

In some embodiments, the light adjusting layer is a dye filter. The dye filter includes a transparent base and a dye layer disposed on the transparent base.

In some embodiments, the light adjusting layer is an interference filter. The interference filter includes two metal films disposed opposite to each other, and a transparent intermediate film disposed between the two metal films.

In some embodiments, the light adjusting layer includes a particle layer absorbing yellow light. The particle layer absorbing yellow light includes a plurality of particles absorbing yellow light. The plurality of particles absorbing yellow light includes an infrared phosphor configured to absorb yellow light.

In some embodiments, an amount of yellow light that can be absorbed by different portions of the light adjusting layer is the same.

In some embodiments, the peripheral display area includes a first sub-area, a second sub-area and a third sub-area arranged in sequence, along a direction of an edge of the liquid crystal display panel to a center of the liquid crystal display panel. The light adjusting layer includes a first sub-light adjusting layer corresponding to the first sub-area, a second sub-light adjusting layer corresponding to the second sub-area, and a third sub-light adjusting layer corresponding to the third sub-area. An average thickness of a liquid crystal cell in the second sub-area is greater than an average thickness of the liquid crystal cell in the first sub-area, and greater than an average thickness of the liquid crystal cell in the third sub-area. An amount of yellow light that the second sub-light adjusting layer can absorb is greater than an amount of yellow light that the first sub-light adjusting layer can absorb, and greater than an amount of yellow light that the third sub-light adjusting layer can absorb.

In some embodiments, the first sub-light adjusting layer includes a plurality of particles absorbing yellow light, the second sub-light adjusting layer includes a plurality of particles absorbing yellow light, and the third sub-light adjusting layer includes a plurality of particles absorbing yellow light. A distribution density of the plurality of particles absorbing yellow light in the second sub-light adjusting layer is greater than a distribution density of the plurality of particles absorbing yellow light in the first sub-light adjusting layer, and greater than a distribution density of the plurality of particles absorbing yellow light in the third sub-light adjusting layer.

In some embodiments, the light adjusting layer includes a particle layer emitting blue light. The particle layer emitting blue light includes a plurality of particles emitting blue light. The plurality of particles emitting blue light includes a blue phosphor.

In some embodiments, an amount of blue light that can be emitted by different portions of the light adjusting layer is the same.

In some embodiments, the peripheral display area includes a first sub-area, a second sub-area and a third sub-area arranged in sequence, along a direction of an edge of the liquid crystal display panel to a center of the liquid crystal display panel. The light adjusting layer includes a first sub-light adjusting layer corresponding to the first sub-area, a second sub-light adjusting layer corresponding to the second sub-area, and a third sub-light adjusting layer corresponding to the third sub-area. An average thickness of a liquid crystal cell in the second sub-area is greater than an average thickness of the liquid crystal cell in the first sub-area, and greater than an average thickness of the liquid crystal cell in the third sub-area. An amount of blue light that the second sub-light adjusting layer can emit is greater than an amount of blue light that the first sub-light adjusting layer can emit, and greater than an amount of blue light that the third sub-light adjusting layer can emit.

In some embodiments, the first sub-light adjusting layer includes a plurality of particles emitting blue light, the second sub-light adjusting layer includes a plurality of particles emitting blue light, and the third sub-light adjusting layer includes a plurality of particles emitting blue light. A distribution density of the plurality of particles emitting blue light in the second sub-light adjusting layer is greater than a distribution density of the plurality of particles emitting blue light in the first sub-light adjusting layer, and greater than a distribution density of the plurality of particles emitting blue light in the third sub-light adjusting layer.

In some embodiments, the light adjusting layer covers a partial area of the peripheral display area. A thickness of a liquid crystal cell in the partial area of the peripheral display area is greater than a thickness of a liquid crystal cell in the intermediate display area.

In some embodiments, the partial area surrounds the intermediate display area, and the partial area is not connected to a non-display area located outside the display area of the liquid crystal display panel.

In some embodiments, the liquid crystal display panel further includes a liquid crystal layer, an upper base substrate disposed at a first side of the liquid crystal layer, and a lower base substrate disposed at a second side of the liquid crystal layer. The light adjusting layer is disposed between the upper base substrate and the lower base substrate. Or the light adjusting layer is disposed at a side of the upper base substrate away from the lower base substrate. Or the light adjusting layer is disposed at a side of the lower base substrate away from the upper base substrate.

BRIEF DESCRIPTION OF THE DRAWINGS

In order to describe technical solutions in some embodiments of the present disclosure or in the related art more clearly, the accompanying drawings to be used in the description of embodiments or related technical description will be introduced briefly. Obviously, the accompanying drawings to be described below are merely some embodiments of the present disclosure, and a person of ordinary skilled in the art can obtain other drawings according to these drawings without paying any creative effort.

DETAILED DESCRIPTION

The technical solutions in embodiments of the present disclosure will be described clearly and completely with reference to the accompanying drawings in embodiments of the present disclosure. Obviously, the described embodiments are merely some but not all of embodiments of the present disclosure. All other embodiments made on the basis of the embodiments of the present disclosure by a person of ordinary skilled in the art without paying any creative effort shall be comprised in the protection scope of the present disclosure.

Figure 4A:
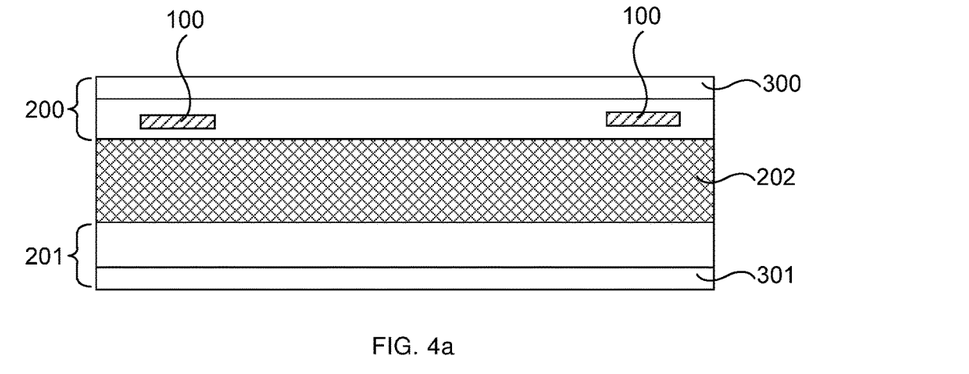
FIG. 4a is a sectional diagram of a liquid crystal display panel, in accordance with some embodiments of the present disclosure.

A liquid crystal display (LCD) panel, as shown in FIG. 4a, includes an upper base substrate (200), a lower base substrate (201) and a liquid crystal layer (202) disposed between the upper base substrate (200) and the lower base substrate (201). A thickness of a liquid crystal cell (also called a thickness of a liquid crystal layer) determines an optical path difference between the light passing through the liquid crystal layer 202, and further determines optical properties of the LCD panel.

It will be noted that the upper base substrate (200) may be a color film substrate, and the lower base substrate (201) may be an array substrate.

Since the liquid crystal has flowability, the thickness of the liquid crystal cell is not fixed. On the one hand, in the liquid crystal dropping process, the liquid crystal spreads around, resulting in more liquid crystal accumulated in a peripheral display area than an intermediate display area, thereby causing that the thickness of the liquid crystal cell in the peripheral display area is uneven.

On the other hand, in the vacuum align system process (VAS process) of the LCD mother board and the process of cutting an LCD mother board into small pieces, a single LCD panel after cutting may be distorted, thereby causing that the thickness of the liquid crystal cell in the peripheral display area is uneven. As a result, optical properties of the peripheral display area are different from those of the intermediate display area.

In this case, since the thickness of the liquid crystal cell in the peripheral display area is uneven, the transmittance of yellow light in the peripheral display area is increased, therefore, the LCD panel has a yellowing problem in the peripheral display area during display.

Figure 1A:
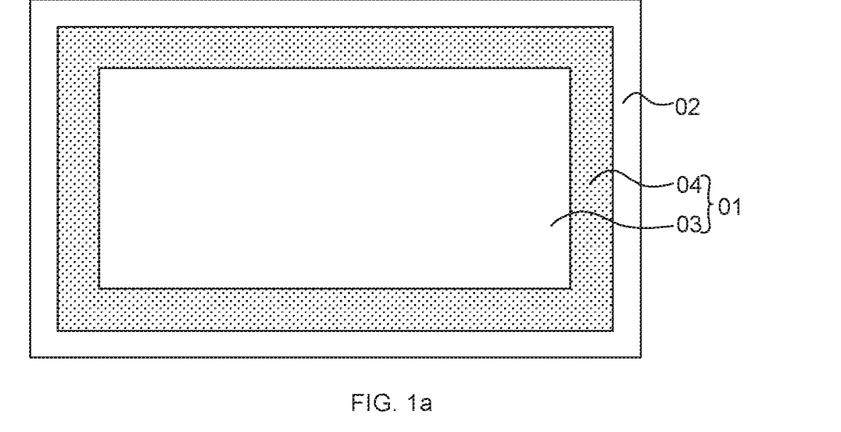
FIG. 1a is a schematic diagram showing a structure of a display area of a liquid crystal display panel divided into an intermediate display area and a peripheral display area, in accordance with some embodiments of the present disclosure.

Some embodiments of the present disclosure provide an LCD panel, as shown in FIG. 1a, and the LCD panel is divided into a display area 01 (also termed as active area, abbreviated as AA) and a non-display area 02.

In addition, the display area 01 includes an intermediate display area 03 and a peripheral display area 04 located at a periphery of the intermediate display area 03.

It will be noted that the division of the intermediate display area 03 and the peripheral display area 04 described above is not limited in the embodiments of the present disclosure.

For example, in some embodiments of the present disclosure, an area that users mainly watch is the intermediate display area 03 in the display area 01, and an area located at a periphery of the intermediate display area 03 is the peripheral display area 04.

Or, in some embodiments of the present disclosure, an area where the thickness of the liquid crystal cell is the same or approximately the same is the intermediate display area 03 in the entire LCD panel. As described above, an area located at a periphery of the intermediate display area 03 is the peripheral display area 04.

The description that the thickness of the liquid crystal cell is approximately the same, means that the thickness of the liquid crystal cell at different positions of the intermediate display area 03 is approximately the same, when the thickness of the liquid crystal cell at different positions of the intermediate display area 03 is within a certain range. For example, if the thickness of the liquid crystal cell at different positions of the intermediate display area 03 is within a range of 3.4±0.01 µm (that is, a range of 3.39 µm to 3.41 µm), the thickness of the liquid crystal cell at different positions of the intermediate display area 03 is approximately the same.

Figure 1B:
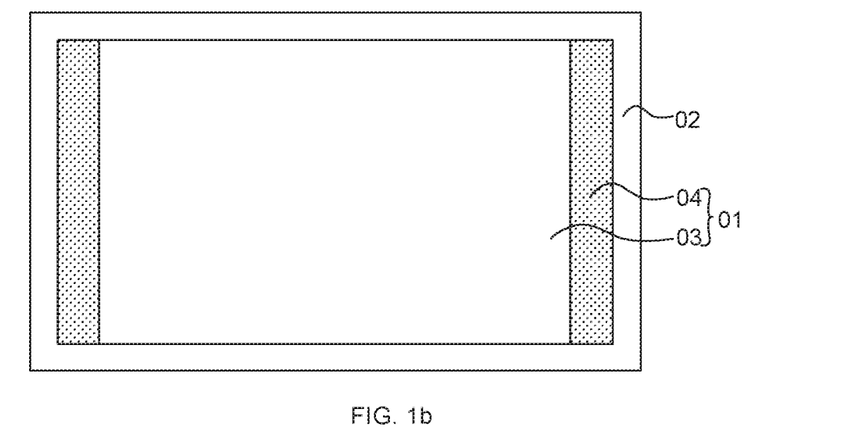
FIG. 1b is a schematic diagram showing a structure of a display area of another liquid crystal display panel divided into an intermediate display area and a peripheral display area, in accordance with some embodiments of the present disclosure.

On this basis, in the process of manufacturing the LCD panel, due to the process reasons, the peripheral display area 04, as shown in FIG. 1a, may encircle the intermediate display area 03 and surround the peripheral of the intermediate display area 03. Or as shown in FIG. 1b, the peripheral display area 04 may be located at side(s) of the intermediate display area 03 but does not surround the intermediate display area 03.

In addition, in some embodiments of the present disclosure, by detecting the thickness of the liquid crystal cell, a relationship curve of may be obtain, which is between the distances H from various positions in the peripheral display area 04 to a boundary of the display area 01 along a direction of an edge of the LCD panel to the center of the LCD panel, and the thickness of the liquid crystal cell.

Figure 2:
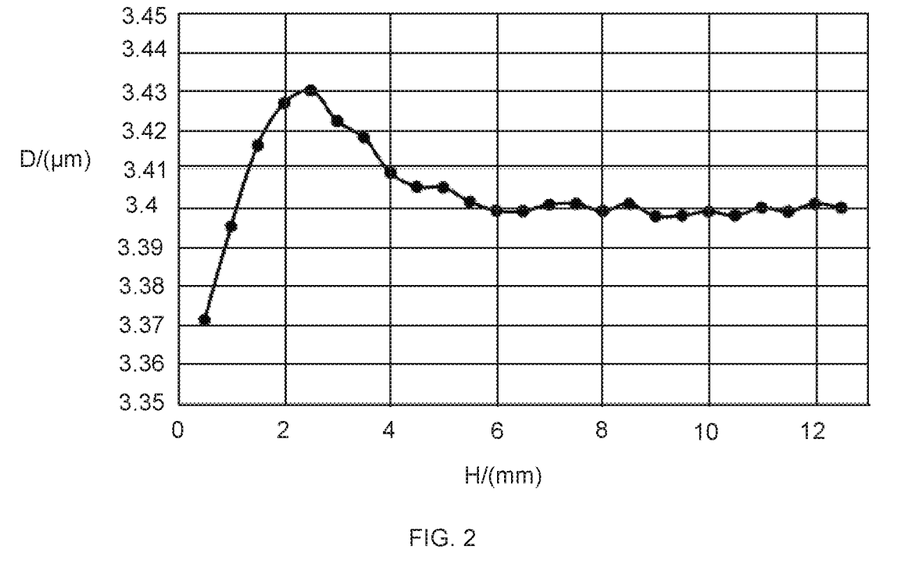
FIG. 2 is a curve diagram showing a relationship between the distances from various positions in the peripheral display area to a boundary of the display area and thicknesses of a liquid crystal cell, in accordance with some embodiments of the present disclosure.

The relationship curve is as shown in FIG. 2. It can be seen that the thickness of the liquid crystal cell in the peripheral display area 04 increases first and then decreases along the direction from the edge of the LCD panel to the center of the LCD panel. First, the thickness of the liquid crystal cell in partial area in the peripheral display area 04 (proximate to the non-display area 02) is less than that in the intermediate display area 03.

Next, in a direction away from the above non-display area 02, the thickness of the liquid crystal cell in the peripheral display area 04 gradually increases, and is greater than the thickness of the liquid crystal cell in the intermediate display area 03. Next, as more closer to intermediate display area 03, the thickness of the liquid crystal cell in the peripheral display area 04 is more closer to the thickness of the liquid crystal cell in the intermediate display area 03.

Figure 3:
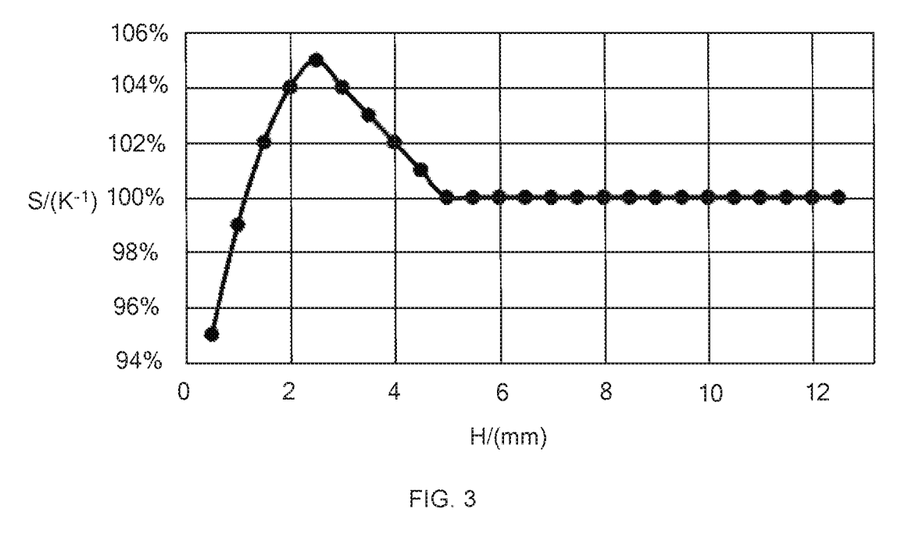
FIG. 3 is a curve diagram showing a relationship between the distances from various positions in the peripheral display area to a boundary of the display area and the yellowing degree of the liquid crystal display panel, in accordance with some embodiments of the present disclosure.

On this basis, it can be correspondingly obtained by the relationship curve as shown in FIG. 2 that, a relationship curve between the distances H from various positions in the peripheral display area 04 to the boundary of the display area 01 and the yellowing degree S of the LCD panel, as shown in FIG. 3.

In FIG. 3, the abscissa stands for the distances H from various positions in the peripheral display area 04 to the boundary of the display area 01, and the ordinate stands for the yellowing degree S of the LCD panel. In FIG. 3, the value that 1 divided by the relative value of color temperature (K) is used to indicate the yellowing degree, wherein k stands for the relative value of color temperature. The higher the value of 1/K is, the more serious the yellowing degree will be. When the ordinate is 100%, the LCD panel displays normally, when the ordinate is less than 100%, the LCD panel displays bluish, and when the ordinate is greater than 100%, the LCD panel displays yellowish.

As can be seen from FIG. 3, a partial area where the thickness of the liquid crystal cell in the peripheral display area 04 is less than that in the intermediate display area 03 emits blue light, that is, the partial area shows bluish during display. A partial area where the thickness of the liquid crystal cell in the peripheral display area 04 is greater than that in the intermediate display area 03 emits yellow light, that is, the partial area shows yellowish during display.

Figure 1C:
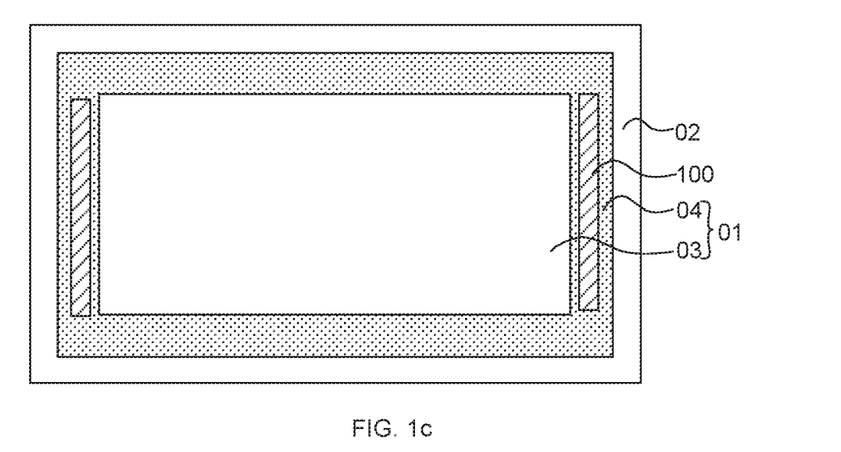
FIG. 1c is a schematic diagram showing a structure of a display area of yet another liquid crystal display panel divided into an intermediate display area and a peripheral display area, in accordance with some embodiments of the present disclosure.

On this basis, as shown in FIG. 1c, the above LCD panel includes a light adjusting layer 100. The light adjusting layer 100 is disposed in the peripheral display area 04. The light adjusting layer 100 is used for absorbing yellow light or for emitting blue light.

The set position of the light adjusting layer 100 in the peripheral display area 04 will be illustrated as follows.

As can be seen from the above, since the partial area where the thickness of the liquid crystal cell in the peripheral display area 04 is less than that in the intermediate display area 03 emits blue light, and the partial area where the thickness of the liquid crystal cell in the peripheral display area 04 is greater than that in the intermediate display area 03 emits yellow light, in some embodiments of the present disclosure, the light adjusting layer 100 can be disposed only in an area that shows yellowish during display in the peripheral display area 04. But an area that shows bluish during display in the peripheral display area is not provided with the light adjusting layer.

Further, in a case where the light adjusting layer 100 is only provided in the area that shows yellowish during display, the light adjusting layer 100 may be disposed in a serious yellowing area in the peripheral display area 04 (for example, a portion in the peripheral display area 04 where the distance H from the portion to the boundary of the display area 01 is approximately 1 to 4 mm). Or all the areas that show yellowish during display in the peripheral display area 04 may be provided with the light adjusting layer.

Or, in some other embodiments of the present disclosure, the light adjusting layer 100 may be disposed in the entire peripheral display area 04. Since the area of the area that shows yellowish during display is small in the peripheral display area 04, and human eyes are not sensitive to blue light, setting the light adjusting layer 100 in the entire peripheral display area 04 does not affect the normal display of the LCD panel.

In addition, as can be seen from the above, the LCD panel, as shown in FIG. 4a, includes an upper base substrate 300 (a base substrate in an upper substrate 200) and a lower base substrate 301 (a base substrate in a lower substrate 201) disposed on both sides of a liquid crystal layer 202.

In this case, as shown in FIG. 4a, the light adjusting layer 100 may be disposed between the upper base substrate 300 and the lower base substrate 301.

Figure 4B:
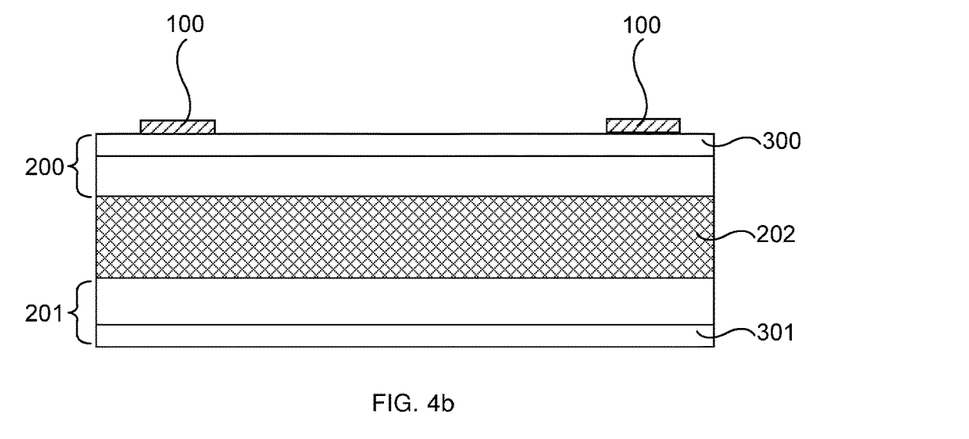
FIG. 4b is a sectional diagram of another liquid crystal display panel, in accordance with some embodiments of the present disclosure.

Or, as shown in FIG. 4b, the light adjusting layer 100 may also be disposed at a side of the upper base substrate 300 away from the lower base substrate 301; or the light adjusting layer 100 may be disposed at a side of the lower base substrate 301 away from the upper base substrate 300.

Figure 4C:
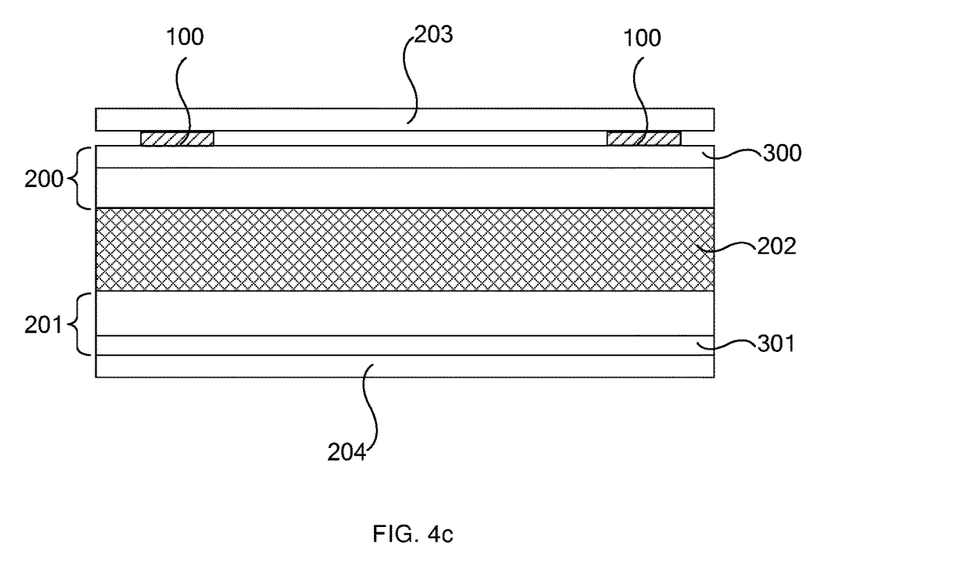
FIG. 4c is a sectional diagram of yet another liquid crystal display panel, in accordance with some embodiments of the present disclosure.

Or, as shown in FIG. 4c, in a case where the LCD panel further includes an upper polarizer 203 and a lower polarizer 204, the light adjusting layer 100 is disposed between the upper polarizer 203 and the upper base substrate 300 in some embodiments of the present disclosure. Or the light adjusting layer 100 is disposed between the lower polarizer 204 and the lower base substrate 301.

Hereinafter the specific structure of the light adjusting layer 100 will be illustrated.

In some embodiments, the light adjusting layer 100 is a filter, and the filter is used for absorbing part of yellow light, and the rest of light can pass through the filter.

The embodiments of the present disclosure do not limit the type of the filter, for example, the filter may be a dye filter or an interference filter.

A dye filter includes a base and a thin layer formed by coating a special dye on the base. The light transmittance of the base is proximate to that of the air, and all colored light can pass through the base. However, after the dye is coated, since the molecular structure of the dye is different from the molecular structure of the original base material, resulting in a change in the light transmittance of the base coated with the above dye relative to the light transmittance of the original base, so that the light transmittance of some color light changes. Here, the corresponding dye can be selected so that part of yellow light is absorbed, and the rest of light can pass.

It will be noted that, the base may be a base substrate in a display panel, or a base substrate without a thin layer. The base substrate may be a glass substrate or a transparent resin substrate.

In addition, the Fabry-Perot interference principle is adopted in some embodiments of the present disclosure, the wavelength range of the transmitted light is controlled by controlling the thickness of the film layer in the filter, and finally part of light is filtered. In this case, the above interference filter is a Fabry-Perot interference filter.

Figure 5:
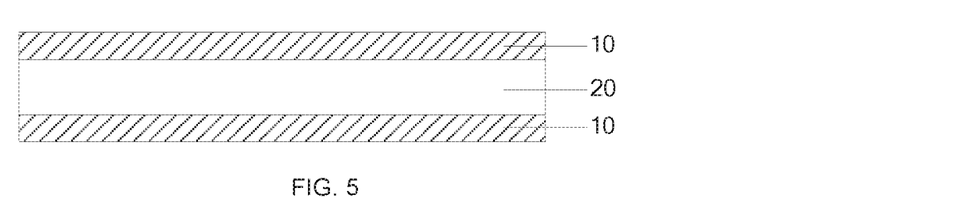
FIG. 5 is a diagram showing a structure of an interference filter, in accordance with some embodiments of the present disclosure.

In some embodiments of the present disclosure, an interference filter is formed by laminating a plurality (i.e., multi-period) optical film layers. For example, as shown in FIG. 5, the interference filter is composed of three films, a metal film 10, an intermediate film 20, and a metal film 10. The upper and lower films, that is, the upper metal film 10 and the lower metal film 10 constitute a reflective layer, and the intermediate film 20 is a transparent spacer layer. If the refractive index of the transparent spacer layer is n, and the thickness of the thin film layer is d.

On this basis, according to the formula n×d=m×λ/2, it can be seen that the n and d of the intermediate film 20 determine the wavelength λ of the light that can pass through the interference filter.

In addition, m is a constant, and the reflectances of the upper and lower metal films 10 determine the above constant m. This constant m can affect the peak transmittance and half width of the interference filter. In this case, when light strikes the interference filter, light with a wavelength less than 2n×d/m can pass through the filter. Here, part of yellow light and light with a wavelength greater than yellow light, that is, light with a long wavelength, can be blocked by controlling the refractive index of the intermediate film 20 and the reflectance of the metal film 10.

It will be noted that, the description that setting parameters of the interference filter can block part of yellow light and the light with a wavelength greater than yellow light, so that the light with a wavelength less than yellow light can be transmitted, means that the interference filter cannot completely block yellow light and the light with a wavelength greater than yellow light, and part of light with a long wavelength can pass through the interference filter, so the display is not affected.

In other embodiments, the light adjusting layer 100 includes a particle layer absorbing yellow light. The particle layer includes a plurality of particles.

The particle layer absorbing yellow light may include infrared phosphor used for absorbing yellow light. In this case, the particles in the particle layer are fluorescent particles in the infrared phosphor.

Based on this, since the phosphor is a photoluminescent material, rare-earth ions in the phosphor are excited by light with a specific wavelength (e.g., a wavelength of yellow light), and electrons of the rare-earth ions absorb energy of the light and transit to a higher energy level, and soon transit to a low energy level again since the high energy level is unstable, and the energy is released in the form of photons. Therefore, the infrared phosphor can be excited by yellow light to emit infrared light, that is, the infrared phosphor can absorb yellow light to emit infrared light. Since the infrared light excited by the above yellow light cannot be perceived by naked eyes, the actual effect of human eyes viewing is that the yellow light is reduced.

In addition, the composition of the infrared phosphor used for absorbing yellow light may be, but is not limited to, $NaYF_4:Yb$.

It will be noted that, the infrared phosphor used for absorbing yellow light provided by the embodiments of the present disclosure is only used to absorb part of yellow light and does not absorb light with other colors.

Here, the distribution density of the particles in the particle layer that absorb yellow light is not limited, and can be adjusted according to the actual yellowing degree of the peripheral display area 04.

In yet other embodiments, the light adjusting layer 100 includes a particle layer emitting blue light. The particle layer includes a plurality of particles.

It will be noted that, since the particle layer emitting blue light can emit blue light, and after the yellow light emitted from the peripheral display area 04 and the blue light emitted from the particle layer emitting blue light are mixed, the light seen by human eyes is white light, thereby achieving the effect of weakening the yellowing visually.

Here, the particle layer emitting blue light may, but is not limited to include blue phosphor. In this case, the particles in the above particle layer are fluorescent particles in the blue phosphor. The blue phosphor can absorb light in the ultraviolet wavelength range (a small amount of light in the ultraviolet wavelength range from the light source provided to the above LCD panel) emits blue light.

On this basis, the composition of the blue phosphor may be, but is not limited to, $Mg_{1-x-y}Sr_yAl_2O_4:Eu_x$.

Here, the distribution density of the particles in the particle layer that emits blue light is not limited, and can be adjusted according to the actual yellowing degree of the peripheral display area 04.

The peripheral display area 04 of the LCD panel in the relative technologies may have a yellowing problem due to the uneven thickness of the liquid crystal cell. However, the peripheral display area 04 of the LCD panel in some embodiments of the present disclosure is provided with a light adjusting layer 100, which can absorb part of yellow light, so unwanted yellow light can be weakened or eliminated (the unwanted yellow light is light that causes the peripheral display area 04 in the relative technologies to show yellowish) to make the optical properties of the peripheral display area consistent or approximately consistent with the optical properties of the intermediate display area. Or the light adjusting layer 100 can emit blue light, and after mixing blue light and yellow light, the light seen by human eyes is white light, thereby visually weakening or eliminating the unwanted yellow light, so that the optical properties of the peripheral display area are consistent or approximately consistent with the optical properties of the intermediate display area. In this way, it can weaken or eliminate the yellowing problem of the peripheral display area 04 that is due to the uneven thickness of the liquid crystal cell in the peripheral display area 04.

Referring to FIG. 3, in a case where the distances H from various positions in the peripheral display area 04 of the LCD panel to the boundary of the display area 01 are different, the yellowing degrees of the various positions in the peripheral display area 04 are different.

In this case, when setting the light adjusting layer 100, the light adjusting capabilities at different positions of the light adjusting layer 100 may be the same or different. The light adjusting capabilities of the light adjusting layer 100 are the same at different positions, that is, the amount of yellow light that can be absorbed or the amount of blue light that can be emitted at different positions of the light adjusting layer 100 is the same, that is, the performances of the light adjusting layer 100 are completely the same at different positions.

For example, in a case where the light adjusting layer 100 is a particle layer that absorbs yellow light, the distribution densities of the particles in the particle layer absorbing yellow light are the same at different positions.

Or, in a case where the light adjusting layer 100 is a dye filter, the components of the dye in the dye filter are the same at different positions.

Or, in a case where the light adjusting layer 100 is an interference filter, the parameters (parameters including thickness, refractive index, reflectance, etc.) of the respective films in the interference filter are the same at different positions.

Or, in a case where the light adjusting layer 100 is a particle layer that emits blue light, the distribution densities of the particles in the particle layer emitting blue light are the same at different positions.

In this way, in a case where the light adjusting capabilities of various positions in the light adjusting layer 100 are the same, the manufacturing process of the light adjusting layer 100 is simple, which is advantageous for simplifying the manufacturing process of the LCD panel.

Figure 6:
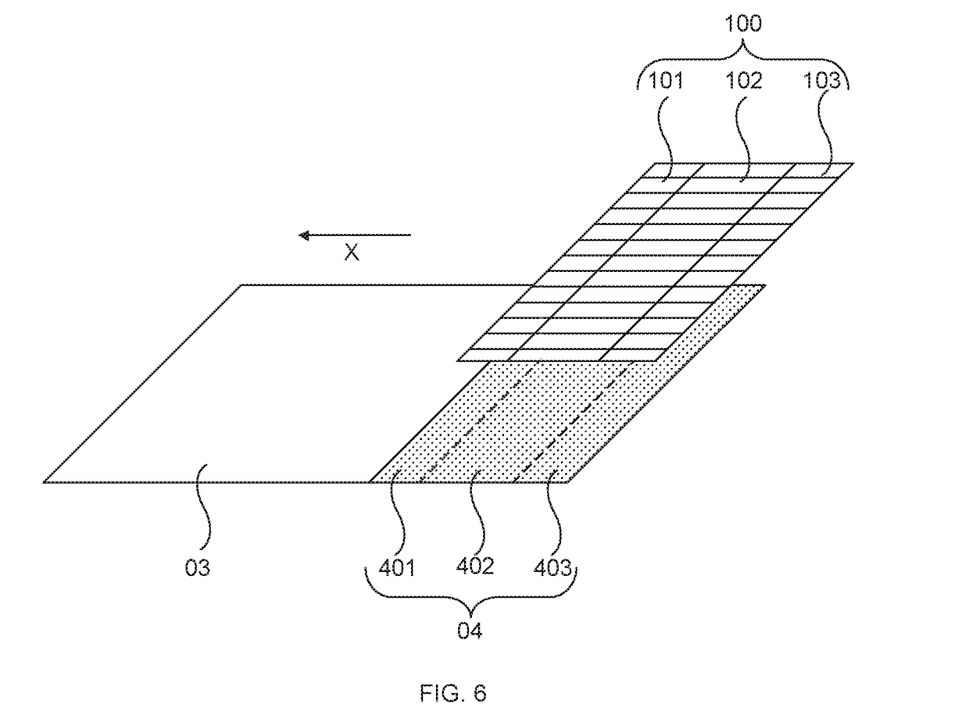
FIG. 6 is a schematic diagram showing a structure of the division of a peripheral display area, in accordance with some embodiments of the present disclosure.

In some embodiments of the present disclosure, as shown in FIG. 6, the peripheral display area 04 is sequentially divided into a first sub-area 401, a second sub-area 402 and a third sub-area 403, along the direction of the edge of the LCD panel to the center of the LCD panel (X direction). In addition, the light adjusting layer 100 is divided into a first sub-light adjusting layer 101 corresponding to the first sub-area 401, a second sub-light adjusting layer 102 corresponding to the second sub-area 402, and a third sub-light adjusting layer 103 corresponding to the third sub-area 403.

On this basis, the average thickness of the liquid crystal cell in the second sub-area 402 is greater than the average thickness of the liquid crystal cell in the first sub-area 401, and greater than the average thickness of the liquid crystal cell in the third sub-area 403. Accordingly, the amount of yellow light that the second sub-light adjusting layer 102 can absorb is greater than the amount of yellow light that the first sub-light adjusting layer 101 can absorb, and greater than the amount of yellow light that the third sub-light adjusting layer 103 can absorb; or the amount of blue light that the second sub-light adjusting layer 102 can emit is greater than the amount of blue light that the first sub-light adjusting layer 101 can emit, and greater than the amount of blue light that the third sub-light adjusting layer 103 can emit.

It will be noted that, since the average thickness of the liquid crystal cell in the second sub-area 402 is greater than the average thickness of the liquid crystal cell in the first sub-area 401, and greater than the average thickness of the liquid crystal cell in the third sub-area 403, the yellowing degree of the second sub-area 402 is greater than the yellowing degree of the first sub-area 401, and greater than the yellowing degree of the third sub-area 403.

Here, since the first sub-light adjusting layer 101 corresponds to the first sub-area 401, the second sub-light adjusting layer 102 corresponds to the second sub-area 402, and the third sub-light adjusting layer 103 corresponds to the third sub-area 403, the amount of yellow light that can be absorbed by the first sub-light adjusting layer 101 or the amount of blue light that can be emitted by the first sub-light adjusting layer 101 can be correspondingly set according to the yellowing degree of the first sub-area 401 in the peripheral display area 04. Similarly, the amount of yellow light that can be absorbed by the second sub-light adjusting layer 102 or the amount of blue light that can be emitted by the second sub-light adjusting layer 102 is correspondingly set according to the yellowing degree of the second sub-area 402. Similarly, the amount of yellow light that can be absorbed by the third sub-light adjusting layer 103 or the amount of blue light that can be emitted by the third sub-light adjusting layer 103 is correspondingly set according to the yellowing degree of the third sub-area 403.

On this basis, the amount of yellow light that the second sub-light adjusting layer 102 can absorb is greater than the amount of yellow light that the first sub-light adjusting layer 101 can absorb, and greater than the amount of yellow light that the third sub-light adjusting layer 103 can absorb, that is, the performance of the second sub-light adjusting layer 102 is different from the performances of the first sub-light adjusting layer 101 and the third sub-light adjusting layer 103.

For example, in a case where the light adjusting layer 100 is a particle layer that absorbs yellow light, the distribution density of the particles in the particle layer absorbing yellow light corresponding to the second sub-area 402 is greater than the distribution density of the particles in the particle layer absorbing yellow light corresponding to the first sub-area 401, and greater than the distribution density of the particles in the particle layer absorbing yellow light corresponding the third sub-area 403.

Or for another example, in a case where the light adjusting layer 100 is a dye filter, the component of the dye filter corresponding to the second sub-area 402 is different from the component of the dye filter corresponding to the first sub-area 401 and the third sub-area 403. The amount of blue light that the second sub-light adjusting layer 102 can emit is greater than the amount of blue light that the first sub-light adjusting layer 101 can emit, and greater than the amount of blue light that the third sub-light adjusting layer 103 can emit, that is, the performance of the second sub-light adjusting layer 102 is different from the performances of the first sub-dimming the layer 101 and the third sub-light adjusting layer 103.

Or for yet another example, in a case where the light adjusting layer 100 is a particle layer that emits blue light, the distribution density of the particles in the particle layer emitting blue light corresponding to the second sub-area 402 is greater than the distribution density of the particles in the particle layer emitting blue light corresponding to the first sub-area 401, and greater than the distribution density of the particles in the particle layer emitting blue light corresponding to the third sub-area 403.

In some embodiments of the present disclosure, the corresponding light adjusting layer 100 is set according to the yellowing degree at different distances from the boundary of the display area 01 in the peripheral display area 04, in this way, the unwanted yellow light in the peripheral display area 04 can be eliminated, thereby improving the display effect.

Some embodiments of the present disclosure provide an LCD device, and the LCD device includes the above LCD panel.

Here, the LCD device further includes a backlight component used for providing a light source for the LCD panel, in addition to the LCD panel.

The LCD device provided by the embodiments of the present disclosure may be any device that displays an image whether moving (for example, a video) or fixed (for example, a still image), and whether literal or graphical.

More specifically, it is expected that the embodiments may be implemented in or associated with a plurality of electronic devices. The plurality of electronic devices may include (but is not limit to), for example, mobile telephones, wireless devices, personal data assistants (PAD), hand-held or portable computers, GPS receivers/navigators, cameras, MP4 video players, video cameras, game consoles, watches, clocks, calculators, TV monitors, flat panel displays, computer monitors, car displays (such as odometer displays, etc.), navigators, cockpit controllers and/or displays, camera view displays (such as rear view camera displays in vehicles), electronic photos, electronic billboards or indicators, projectors, building structures, packagings and aesthetic structures (such as a display for an image of a piece of jewelry) etc.

The peripheral display area 04 of the LCD panel in the relative technologies may have a yellowing problem due to the uneven thickness of the liquid crystal cell, but some embodiments of the present disclosure provide an LCD device, and the LCD device includes an LCD panel, the peripheral display area 04 of the LCD panel is provided with a light adjusting layer 100, and the light adjusting layer 100 can absorb yellow light, thereby weakening or eliminating the unwanted yellow light (the unwanted yellow light is light that causes the peripheral display area 04 in the relative technologies to display yellowish), or the light adjusting layer 100 can emit blue light, and after blue light and yellow light are mixed, the light seen by human eyes is white light, thereby visually weakening or eliminating the unwanted yellow light, which can weaken or eliminate the yellowing problem of the peripheral display area 04 due to the uneven thickness of the liquid crystal cell.

Figure 7:
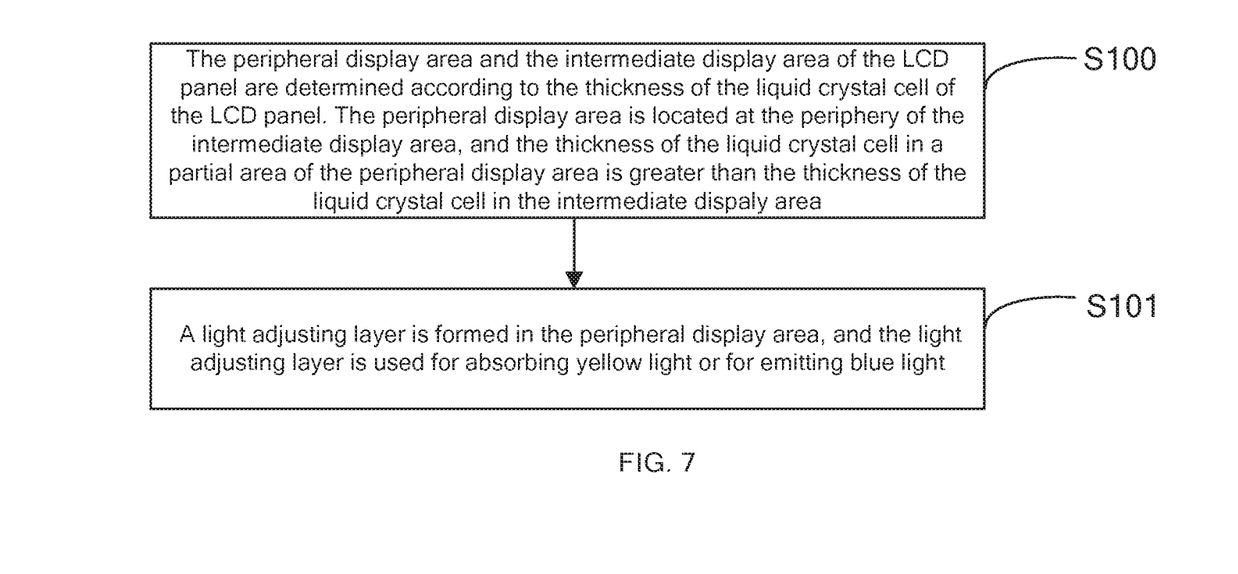
FIG. 7 is a schematic diagram showing a method of manufacturing a liquid crystal display panel, in accordance with some embodiments of the present disclosure.

Some embodiments of the present disclosure further provide a method of manufacturing an LCD panel, as shown in FIG. 7, and the method includes step 100 (S100) and step 101 (S101).

In S100, a peripheral display area 04 and an intermediate display area 03 of the LCD panel are determined according to the thickness of the LCD panel. The peripheral display area 04 is located at the periphery of the intermediate display area 03, and the thickness of the liquid crystal cell of a partial area in the peripheral display area 04 is greater than the thickness of the liquid crystal cell in the intermediate display area 03.

It will be noted that, the area where the thickness of the liquid crystal cell at different positions is the same or approximately the same, is the intermediate display area 03. Since the display area 01 is composed of two parts, that is the intermediate display area 03 and the peripheral display area 04. In a case where the area where the thickness of the liquid crystal cell at different positions is the same or approximately the same is the intermediate display area 03, the area other than the intermediate display area 03 in the display area 01 is the peripheral display area 04. In addition, in a case where the thickness of the liquid crystal cell at different positions of the intermediate display area 03 is within a certain range, the thickness of the liquid crystal cell at different positions of the intermediate display area 03 is approximately the same. For example, if the thickness of the liquid crystal cell at different positions of the intermediate display area 03 is within the range of 3.4±0.01 μm, the thickness of the liquid crystal cell at different positions of the intermediate display area 03 is approximately the same.

Here, before the peripheral display area 04 and the intermediate display area 03 of the LCD panel are determined according to the thickness of the liquid crystal cell of the LCD panel, the above manufacturing method further includes obtaining the thickness of the liquid crystal cell of the LCD panel. The following three manners are provided to obtain the thickness of the liquid crystal cell of the LCD panel.

First, in a case where the sizes of a plurality of manufactured LCD panels are the same, the plurality of manufactured LCD panels can be detected to obtain the thicknesses distribution of the liquid crystal cells of the plurality of LCD panels.

Second, in the manufacturing process of the LCD panel provided by some embodiments of the present disclosure, in a case where a mother board including the upper base substrate 200 and a mother board including the lower base substrate 201 are disposed opposite to each other to form an LCD panel mother board, after the LCD panel mother board is cut to obtain LCD panels, the obtained LCD panels are detected to obtain the thickness distributions of the liquid crystal cell of the LCD panels.

Third, an analytical model is established to estimate the thickness distribution of the liquid crystal cell of the LCD panel, according to the area of the sealant coating region in the LCD panel, the height of the sealant and the peripheral support design, in combination with the empirical data of similar products.

In S101, a light adjusting layer 100 is formed in the peripheral display area 04, and the light adjusting layer 100 is used for absorbing yellow light or for emitting blue light.

It will be noted that the setting position of the light adjusting layer 100 is not limited. For example, as shown in FIG. 5a, the light adjusting layer 100 may be disposed between the upper base substrate 300 (the base substrate in the upper substrate 200) and the lower base substrate 301 (the base substrate in the lower substrate 201); or the light adjusting layer 100 may be disposed at a side of the upper base substrate 300 away from the lower base substrate 301, or the light adjusting layer 100 may be disposed at a side of the lower base substrate 301 away from the upper base substrate 300.

In addition, when the thickness distributions of the liquid crystal cell of the LCD panels are obtained by the second manner, the light adjusting layer 100 can be formed at the side of the upper base substrate 300 away from the lower base substrate 301, or at the side of the lower base substrate 301 away from the upper base substrate 300.

Here, according to the relationship curve between the distances H from the various positions in the peripheral display area 04 to the boundary of the display area 01 and the thickness D of the liquid crystal cell, along the direction of the edge of the LCD panel to the center of the LCD panel shown in FIG. 2, the relationship curve between the distances H from the various positions in the peripheral display area 04 to the boundary of the display area 01 and the yellowing degrees S of the LCD panel shown in FIG. 3 is obtained.

As can be seen from FIG. 3, the portion where the thickness of the liquid crystal cell in the peripheral display area 04 is less than that in the intermediate display area 03 emits blue light, that is, the portion shows bluish during display, and the portion where the thickness of the liquid crystal cell in the peripheral display area 04 is greater than that in the intermediate display area 03 emits yellow light, that is, the portion shows yellowish during display.

Based on this, the light adjusting layer 100 may be disposed only in the peripheral yellowish display area, and the light adjusting layer 100 is not disposed in the peripheral bluish display area. Or the light adjusting layer 100 may be disposed in the entire peripheral display area 04.

Since the area of the peripheral bluish display area is small and human eyes are not sensitive to blue light, setting the light adjusting layer 100 in the entire peripheral display area 04 does not affect the normal display of the LCD panel. In addition, in a case where the light adjusting layer 100 is provided only in the peripheral yellowish display area, the light adjusting layer 100 may be disposed in an area where the yellowing is severe in the peripheral yellowish display area (for example, an area, the distance from which to the display area 01 is within a range from 1 to 4 mm), or the light adjusting layer 100 may be provided in the entire peripheral yellowish display area.

The peripheral display area 04 of the LCD panel in the relative technologies may have a yellowing problem due to the uneven thickness of the liquid crystal cell, but some embodiments of the present disclosure provide a method of manufacturing an LCD panel, the peripheral display area 04 of the LCD panel is provided with a light adjusting layer 100, which can absorb part of the yellow light, so that the unwanted yellow light can be weakened or eliminated (the unwanted yellow light is light that causes the peripheral display area 04 in the relative technologies to display yellowish).

Or the light adjusting layer 100 can emit blue light, and after mixing blue light and yellow light, the light seen by human eyes is white light, thereby visually weakening or eliminating the unwanted yellow light, which can weaken or eliminate the yellowing problem of the peripheral display area 04 due to the uneven thickness of the liquid crystal cell in the peripheral display area 04.

In some embodiments of the present disclosure, when a light adjusting layer 100 is formed in the peripheral display area 04, a corresponding light adjusting layer 100 may be formed in the peripheral display area 04 according to an empirical value (for example, a positional information of the yellowing region), as long as the yellowing problem of the peripheral display area 04 can be weakened or eliminated.

Or, the light adjusting layer 100 may be formed in the peripheral display area 04 according to the thickness distribution or yellowing condition of the peripheral display area 04 of the LCD panel along the direction of the edge of the LCD panel to the center of the LCD panel.

Since the thickness distributions or the yellowing condition of different LCD panels are different, in some embodiments of the present disclosure, the step of forming the light adjusting layer 100 in the peripheral display area 04, includes: forming the light adjusting layer 100 in the peripheral display area 04, according to the thickness distribution of the liquid crystal cell or the yellowing degree in the peripheral display area 04, along the direction from the edge of the LCD panel to the center of the LCD panel, which can ensure that the formed light adjusting layer 100 can better absorb the unwanted yellow light.

The yellowing degrees at different distances from the boundary of the display area 01 in the peripheral display area 04 of the LCD panel are different. In the process of forming the light adjusting layer 100, the light adjusting capabilities of the light adjusting layer 100 at different positions may be the same or may be different.

The light adjusting capabilities of the light adjusting layer 100 at different positions are the same, that is, the amount of yellow light that can be absorbed at different positions of the light adjusting layer 100 is the same or the amount of blue light that can be emitted at different positions of the light adjusting layer 100 is the same. That is to say, the performances at different positions of the light adjusting layer 100 is completely the same. In a case where the light adjusting capability at different positions of the light adjusting layer 100 is the same, the manufacturing process of the light adjusting layer 100 is simple, which is advantageous for simplifying the manufacturing process of the LCD panel.

In some embodiments of the present disclosure, according to the thickness distribution of the liquid crystal cell or yellowing condition in the peripheral display area 04 along the direction of the edge of the LCD panel to the center of the LCD panel, a light adjusting layer 100 is formed in the peripheral display area 04, which can ensure that the formed light adjusting layer 100 can better absorb the unwanted yellow light, and the above method includes:

As shown in FIG. 6, the peripheral display area 04 is sequentially divided into the first sub-area 401, the second sub-area 402 and the third sub-area 403, along the direction X of the edge of the LCD panel to the center of the LCD panel.

The light adjusting layer 100 is divided into a first sub-light adjusting layer 101 corresponding to the first sub-area 401, a second sub-light adjusting layer 101 corresponding to the second sub-area 402, and a third sub-light adjusting layer 403 corresponding to the third sub-area 403.

The average thickness of the liquid crystal cell in the second sub-area 402 is greater than the average thickness of the liquid crystal cell in the first sub-area 401, and greater than the average thickness of the liquid crystal cell in the third sub-area 403.

The amount of yellow light that the second sub-light adjusting layer 102 can absorb is greater than the amount of yellow light that the first sub-light adjusting layer 101 can absorb, and greater than the amount of yellow light that the third sub-light adjusting layer 103 can absorb; or the amount of blue light that the second sub-light adjusting layer 102 can emit is greater than the amount of blue light that the first sub-light adjusting layer 101 can emit, and greater than the amount of blue light that the third sub-light adjusting layer 103 can emit.

It will be noted that, since the average thickness of the liquid crystal cell of the second sub-area 402 is greater than the average thickness of the liquid crystal cell of the first sub-area 401, and greater than the average thickness of the liquid crystal cell thickness of the third sub-area 403, the yellowing degree of the second sub-area 402 is greater than the yellowing degree of the first sub-area 401, and greater than the yellowing degree of the third sub-area 403.

Here, since the first sub-light adjusting layer 101 corresponds to the first sub-area 401, the second sub-light adjusting layer 102 corresponds to the second sub-area 402, and the third sub-light adjusting layer 103 corresponds to the third sub-area 403, the amount of yellow light that can be absorbed by the first sub-light adjusting layer 101 or the amount of blue light that can be emitted by the first sub-light adjusting layer 101 can be correspondingly set according to the yellowing degree of the first sub-area 401 in the peripheral display area 04. Similarly, the amount of yellow light that can be absorbed by the second sub-light adjusting layer 102 or the amount of blue light that can be emitted by the second sub-light adjusting layer 102 is correspondingly set according to the yellowing degree of the second sub-area 402. Similarly, the amount of yellow light that can be absorbed by the third sub-light adjusting layer 103 or the amount of blue light that can be emitted by the third sub-light adjusting layer 103 is correspondingly set according to the yellowing degree of the third sub-area 403.

In some embodiments of the present disclosure, the corresponding light adjusting layer 100 is set according to the yellowing degree at different distances from the boundary of the display area 01 in the peripheral display area 04, so that the unwanted yellow light in the peripheral display area 04 can be eliminated, and the display effect can be improved.

The foregoing descriptions are merely specific implementation manners of the present disclosure, but the protection scope of the present disclosure is not limited thereto. Any person skilled in the art could readily conceive of changes or replacements within the technical scope of the present disclosure, which shall all be comprised in the protection scope of the present disclosure. Therefore, the protection scope of the present disclosure shall be subject to the protection scope of the claims.

What is claimed is:

1. A liquid crystal display panel, comprising a light adjusting layer, wherein the light adjusting layer is configured to reduce a yellowing degree of a peripheral display area;
   the light adjusting layer is located in the peripheral display area in a display area of the liquid crystal display panel, and the peripheral display area is located at a periphery of an intermediate display area in the display area, wherein
   a value of 1/K is used to indicate the yellowing degree, wherein, K is relative value of color temperature;
   the light adjusting layer covers a partial area of the peripheral display area, and a thickness of a liquid crystal cell in the partial area of the peripheral display area is greater than a thickness of a liquid crystal cell in the intermediate display area.

2. The liquid crystal display panel according to claim 1, wherein the light adjusting layer is configured to absorb yellow light.

3. The liquid crystal display panel according to claim 1, wherein the light adjusting layer is configured to emit blue light.

4. The liquid crystal display panel according to claim 2, wherein the light adjusting layer is a dye filter, and the dye filter includes a transparent base and a dye layer disposed on the transparent base.

5. The liquid crystal display panel according to claim 2, wherein the light adjusting layer is an interference filter, and the interference filter includes two metal films disposed opposite to each other, and a transparent intermediate film disposed between the two metal films.

6. The liquid crystal display panel according to claim 2, wherein the light adjusting layer includes a particle layer absorbing yellow light; and the particle layer absorbing yellow light includes a plurality of particles absorbing yellow light, and the plurality of particles absorbing yellow light includes an infrared phosphor configured to absorb yellow light.

7. The liquid crystal display panel according to claim 2, wherein an amount of yellow light that can be absorbed by different portions of the light adjusting layer is the same.

8. The liquid crystal display panel according to claim 2, wherein the peripheral display area includes a first sub-area, a second sub-area and a third sub-area arranged in sequence, along a direction of an edge of the liquid crystal display panel to a center of the liquid crystal display panel; and
   the light adjusting layer includes a first sub-light adjusting layer corresponding to the first sub-area, a second sub-light adjusting layer corresponding to the second sub-area, and a third sub-light adjusting layer corresponding to the third sub-area, wherein
   an average thickness of a liquid crystal cell in the second sub-area is greater than an average thickness of the liquid crystal cell in the first sub-area, and greater than an average thickness of the liquid crystal cell in the third sub-area; and
   an amount of yellow light that the second sub-light adjusting layer can absorb is greater than an amount of yellow light that the first sub-light adjusting layer can absorb, and greater than an amount of yellow light that the third sub-light adjusting layer can absorb.

9. The liquid crystal display panel according to claim 8, wherein the first sub-light adjusting layer includes a plurality of particles absorbing yellow light, the second sub-light adjusting layer includes a plurality of particles absorbing yellow light, and the third sub-light adjusting layer includes a plurality of particles absorbing yellow light, wherein
   a distribution density of the plurality of particles absorbing yellow light in the second sub-light adjusting layer is greater than a distribution density of the plurality of particles absorbing yellow light in the first sub-light adjusting layer, and greater than a distribution density of the plurality of particles absorbing yellow light in the third sub-light adjusting layer.

10. The liquid crystal display panel according to claim 3, wherein the light adjusting layer includes a particle layer emitting blue light; and the particle layer emitting blue light includes a plurality of particles emitting blue light, and the plurality of particles emitting blue light includes a blue phosphor.

11. The liquid crystal display panel according to claim 3, wherein an amount of blue light that can be emitted by different portions of the light adjusting layer is the same.

12. The liquid crystal display panel according to claim 3, wherein the peripheral display area includes a first sub-area, a second sub-area and a third sub-area arranged in sequence, along a direction of an edge of the liquid crystal display panel to a center of the liquid crystal display panel; and
    the light adjusting layer includes a first sub-light adjusting layer corresponding to the first sub-area, a second sub-light adjusting layer corresponding to the second sub-area, and a third sub-light adjusting layer corresponding to the third sub-area, wherein
    an average thickness of a liquid crystal cell in the second sub-area is greater than an average thickness of the liquid crystal cell in the first sub-area, and greater than an average thickness of the liquid crystal cell in the third sub-area; and
    an amount of blue light that the second sub-light adjusting layer can emit is greater than an amount of blue light that the first sub-light adjusting layer can emit, and greater than an amount of blue light that the third sub-light adjusting layer can emit.

13. The liquid crystal display panel according to claim 12, wherein the first sub-light adjusting layer includes a plurality of particles emitting blue light, the second sub-light adjusting layer includes a plurality of particles emitting blue light, and the third sub-light adjusting layer includes a plurality of particles emitting blue light, wherein
    a distribution density of the plurality of particles emitting blue light in the second sub-light adjusting layer is greater than a distribution density of the plurality of particles emitting blue light in the first sub-light adjusting layer, and greater than a distribution density of the plurality of particles emitting blue light in the third sub-light adjusting layer.

14. The liquid crystal display panel according to claim 1, wherein the partial area surrounds the intermediate display area, and the partial area is not connected to a non-display area located outside the display area of the liquid crystal display panel.

15. The liquid crystal display panel according to claim 1, further comprising:
   a liquid crystal layer;
   an upper base substrate disposed at a first side of the liquid crystal layer; and
   a lower base substrate disposed at a second side of the liquid crystal layer, wherein
   the light adjusting layer is disposed between the upper base substrate and the lower base substrate; or
   the light adjusting layer is disposed at a side of the upper base substrate away from the lower base substrate; or
   the light adjusting layer is disposed at a side of the lower base substrate away from the upper base substrate.

\* \* \* \* \*